US010301199B2

(12) United States Patent
Chung et al.

(10) Patent No.: US 10,301,199 B2
(45) Date of Patent: May 28, 2019

(54) METHOD FOR SELECTIVE ELECTROCHEMICAL REMOVAL OF IONS IN WATER/WASTEWATER

(71) Applicant: Industrial Technology Research Institute, Chutung, Hsinchu County (TW)

(72) Inventors: Li-Ching Chung, Chutung (TW); Teh-Ming Liang, Chutung (TW); Ren-Yang Horng, Chutung (TW); Hsin Shao, Chutung (TW); Po-I Liu, Chutung (TW); Min-Chao Chang, Chutung (TW); Chia-Heng Yen, Chutung (TW); Chih-Hsiang Fang, Chutung (TW)

(73) Assignee: Industrial Technology Research Institute, Chutung, Hsinchu County (TW)

( * ) Notice: Subject to any disclaimer, the term of this patent is extended or adjusted under 35 U.S.C. 154(b) by 391 days.

(21) Appl. No.: 15/185,558

(22) Filed: Jun. 17, 2016

(65) Prior Publication Data

US 2016/0297695 A1 Oct. 13, 2016

Related U.S. Application Data

(63) Continuation-in-part of application No. 14/575,202, filed on Dec. 18, 2014, now Pat. No. 9,957,171.

(30) Foreign Application Priority Data

Dec. 19, 2013 (TW) .............................. 102147137 A (51) Int. Cl.
*C02F 1/46* (2006.01)
*C02F 1/461* (2006.01)
(Continued)

(52) U.S. Cl.
CPC .......... *C02F 1/46114* (2013.01); *C02F 1/288* (2013.01); *C02F 1/469* (2013.01);
(Continued)

(58) Field of Classification Search
None
See application file for complete search history.

(56) References Cited

U.S. PATENT DOCUMENTS 6,107,354 A 8/2000 Shaniuk et al.
6,309,532 B1 10/2001 Tran et al.
(Continued)

FOREIGN PATENT DOCUMENTS

CN 1371299 A 9/2002
CN 1522968 A 8/2004
(Continued)

OTHER PUBLICATIONS

Liu et al., Microwave-assisted ionothermal synthesis of nanostructured anatase titanium dioxide/activated carbon composite as electrode material for capacitive deionization, Feb. 28, 2013, Electrochemica Acta 96, pp. 173-179 (Year: 2013).*
(Continued)

*Primary Examiner* — Arun S Phasge
(74) *Attorney, Agent, or Firm* — McCarter & English, LLP; Yu Lu (57) ABSTRACT

A method for electrochemically selectively removing ions using a composite electrode is provided. The composite electrode includes a composite having a carbon support and an inorganic material immobilized on the carbon support.

17 Claims, 4 Drawing Sheets

(51) Int. Cl.
  C02F 1/28    (2006.01)
  C02F 1/469   (2006.01)
  C02F 101/10  (2006.01)
  C02F 101/16  (2006.01)
(52) U.S. Cl.
  CPC ............... C02F 1/46109 (2013.01); C02F 2001/46138 (2013.01); C02F 2101/10 (2013.01); C02F 2101/103 (2013.01); C02F 2101/105 (2013.01); C02F 2101/16 (2013.01)

(56) References Cited

U.S. PATENT DOCUMENTS

| | | | |
|---|---|---|---|
| 6,645,366 | B2 | 11/2003 | Iseki et al. |
| 7,300,591 | B2 | 11/2007 | Ikematsu et al. |
| 7,625,492 | B2 | 12/2009 | Jin et al. |
| 7,758,756 | B2 | 7/2010 | Kim |
| 8,187,861 | B1 | 5/2012 | Schuh |
| 8,361,327 | B2 | 1/2013 | Lee et al. |
| 8,460,520 | B2 | 6/2013 | Rigby |
| 2014/0144779 | A1* | 5/2014 | Jeong ............. C02F 1/4691 204/536 |
| 2015/0175450 | A1 | 6/2015 | Chung et al. |

FOREIGN PATENT DOCUMENTS

| | | |
|---|---|---|
| CN | 101066526 A | 11/2007 |
| CN | 101236870 A | 8/2008 |
| CN | 101269870 A | 9/2008 |
| CN | 101304945 A | 11/2008 |
| CN | 101718738 A | 6/2010 |
| CN | 102350279 A | 2/2012 |
| CN | 102441365 A | 5/2012 |
| JP | 2007038203 A | 2/2007 |
| JP | 2012035183 A | 2/2012 |
| TW | 585840 B | 5/2004 |
| TW | 200942323 A | 10/2009 |
| TW | 200942495 A | 10/2009 |
| TW | I376355 B | 11/2012 |
| TW | I487661 B | 6/2015 |

OTHER PUBLICATIONS

Liu et al. Preparing CNTs/Ca-Selective zeolite composite electrode to remove calcium ions by capacitive deionization, Oct. 1, 2013, Desalination vol. 326, pp. 109-114. (Year: 2013).*
Wouters et al. "Carbon Fiber Sheets coated with thin-films of Sio2 and gamma-Al2O3 as electrodes in capacitvie deionization: Relationship between properties of teh oxide films and electrode performance", Sep. 2013, Electrochimica Acta, 112, pp. 763-773. (Year: 2013).*
Avraham et al., "Developing Ion Electroadsorption Stereoselectivity, by Pore Size Adjustment with Chemical Vapor Deposition onto Active Carbon Fiber Electrodes. Case of Ca2+/Na+ Separation in Water Capacitive Desalination," J. Phys. Chem. C., 112(19):7385-7389 (2008).
Bilyk et al., "Nutrient Recovery: State of the Knowledge," Water Environment Research Foundation (WERF), pp. 1-44 (2010).
Chitrakar et al., "Adsorption of phosphate from seawater on calcined MgMn-layered double hydroxides," J. Colloid Interface Sci., 290:45-51 (2005).
Cornel and Schaum, "Phosphorus Recovery from Wastewater: Needs, Technologies and Costs," Water Sci. Tech.-WST, 59.6:1069-1076 (2009).
Halim et al., "Comparison study of ammonia and COD adsorption on zeolite, activated carbon and composite materials in landfill leachate treatment," Desalination, 262:31-35 (2010).
He et al., "High adsorption selectivity of ZnAl layered double hydroxides and the calcined materials toward phosphate," J. Colloid Interface Sci., 343:225-231 (2010).
Kalogo and Monteith, "The State of Science Report: Energy and Resource Recovery from Sludge," Water Environment Research Foundation (WERF), www.werf.org, pp. 1-238 (2008).
Kang et al., "Use of Iron Oxide Particles as Adsorbent to Enhance Phosphorus Removal from Secondary Wastewater Effluent," Separation Sci. Tech., 38(15):3853-3874 (2003).
Kim and Choi, "Selective removal of nitrate ion using a novel composite carbon electrode in capacitive deionization," Water Research, 46:6033-6039 (2012).
Morse et al., "Review: Phosphorus removal and recovery technologies," Science of the Total Environment, 212(1):69-81 (1998).
Reháková et al., "Agricultural and agrochemical uses of natural zeolite of the clinoptilolite type," Current Opinion in Solid State and Materials Science, 8:397-404 (2004).
Smith and Dassanayake, "Energy Conservation and Recovery in Wastewater Treatment Facilities," OWEA 2010 Biosolids Specialty Workshop, Columbus, OH, pp. 1-42 (2010).
Wang et al., "Ion exchange of ammonium in natural and synthesized zeolites," J. Hazardous Mater., 160:371-375 (2008).
Weatherley and Miladinovic, "Comparison of the ion exchange uptake of ammonium ion onto New Zealand clinoptilolite and mordenite," Water Research, 38:4305-4312 (2004).
Yang et al., "Ion-selective carbon nanotube electrodes in capacitive deionization," Electrochimica Acta, 91:11-19 (2013).
Zhang et al., "Separation and preconcentration of trace indium(III) from environmental samples with nanometer-size titanium dioxide," Hydrometallurgy, 95:92-95 (2009).
CN 101066526 English Abstract.
CN 101269870 English abstract.
CN 101304945 English abstract.
CN 101718738 English abstract.
CN 102350279 English abstract.
CN 102441365 English abstract.
CN 1371299 English Abstract.
CN 1522968A English abstract.
JP 2007038203 English abstract.
JP 2012035183A English abstract.
TW 585840 English abstract.
TW I376355 English abstract.
TW I487661 English abstract.
CN 101236870 English abstract.
Cordell, The Story of Phosphorus—Sustainability implications of global phosphorus scarcity for food security. Thesis. Institute for Sustainable Futures, University of Technology, Sydney, Linkoping University. 240 pages. (2010).
Office Action issued in Taiwan Application No. 102147137 dated Jun. 30, 2015.
Office Action dated Mar. 15, 2016 in TW 102147137.
Office Action dated Mar. 23, 2016 in CN 201410489591.3.
TW 200942495 English abstract.
Non-Final Office Action for U.S. Appl. No. 14/575,202, dated Dec. 14, 2017. 19 pages.

* cited by examiner

METHOD FOR SELECTIVE ELECTROCHEMICAL REMOVAL OF IONS IN WATER/WASTEWATER

CROSS-REFERENCE TO RELATED APPLICATIONS

This application is a continuation-in-part (CIP) of U.S. Ser. No. 14/575,202, filed on Dec. 18, 2014, and claims foreign priority under 35 U.S.C. § 119(a) to Patent Application No. 102147137, filed on Dec. 19, 2013, in the Intellectual Property Office of Ministry of Economic Affairs, Republic of China (Taiwan, R.O.C.). The entirety of each of the above-mentioned patent applications is hereby incorporated by reference herein and made a part of this specification.

BACKGROUND

1. Technical Field

The present disclosure is directed to water purification. The present disclosure is directed to a method for selective electrochemical removal of ions.

2. Description of Related Art

The regulations to the phosphorus content of discharged wastewater are getting stricter in many countries. Also, in consideration of the benefits of the resources reservation, the development of removal and recovery method of phosphorus have drawn much attention in the worldwide.

The dual functions involving wastewater treatment as well as resource recovery have been emphasized in recent years. Traditionally, the treated wastewater is discharged, and the phosphorus content of the effluent needs to be removed to meet the regulations. However, if the phosphorus can be recovered simultaneously, the treatment process will be more profitable.

Nearly all phosphorus existing in the wastewater is in the form of phosphate such as organophosphate, polyphosphate and orthophosphate. The phosphorus concentration is generally low, thereby influencing the removal efficiency of phosphorus. Further, the wastewater contains many kinds of salts such as sulfate, carbonate and nitrate. Hence, the economic benefits of the recovery of phosphorus mainly depend on the target content of the raw wastewater, the selectivity to phosphorus and the cost of the recovery method. Therefore, increasing the phosphorus selectivity of the technique is useful to enhance the benefits of the recycling of phosphorus.

The current techniques for removal of phosphorus in the wastewater include the chemical precipitation method, biological treatment process and adsorption method. The chemical precipitation method uses a variety of cations to effectively precipitate and remove phosphorus in the wastewater by adding chemical agents such as magnesium chloride, calcium chloride or ammonium bicarbonate precipitant. However, this method has poor selectivity to phosphorus, such that they are usually deposed as waste residue for landfill. In addition, the performance of chemical precipitation method is affected by the pH value, the chemical adding position and the addition dosage. Also, such method requires large quantity of chemical agents and needs the storage space and equipment, and it would produce a lot of sludge. In this method, the phosphorus can also be recovered when the additional complicated chemical process is applied. Thus, the chemical precipitation method frequently causes the increased cost of the factory construction and maintenance.

As to the conventional biological treatment process, the content of phosphorus taken by the microorganisms is limited. Further, the microorganisms in such system are easily affected by the quality of the wastewater. Thus, the operation of the biological treatment process is unstable.

The adsorption method removes and recovers phosphorus by using the adsorbent through the adsorption and ion exchange. The examples of the known adsorbents are silica gel, activated carbon, molecular sieve, clay, ion-exchange resin and so on. The adsorbents can be further modified by different functional groups towards the specific cation or anion removal. However, the selectivity of the adsorbents is usually low, such that the adsorbents easily adsorb other ionic impurities. Further, the frequent regeneration of adsorbents consumes large amounts of acid and base reagents. Generally, the consumption ratio of regenerant and resin is about 1.5 to 5 and therefore this method is not environmentally friendly. Moreover, the common adsorbents also have the disadvantages that the specific surface area of the adsorbents is low, the adsorption rate is low (the reaction reached adsorption equilibrium after 24 to 72 hours) and it is difficult to separate the suspended powder adsorbents.

In addition to the phosphorus, there still exist other valuable or hazardous ions in the different kinds of wastewater, such as ammonium, indium, calcium, arsenic, etc. Thus, we need apparatus and method for removing specific ions from the wastewater.

SUMMARY OF THE INVENTION

A method for selective electrochemical removal of ions, which is capable of rapidly achieving the effect of selectively removing ions, is provided. The method for selective electrochemical removal of ions of the present disclosure comprises providing a composite electrode, and applying a voltage to the composite electrode to enhance the ion adsorption efficiency and rate of inorganic adsorbent material for selectively removing ions by an electrical driving force.

The present disclosure provides a method for selective electrochemical removal of ions, comprising providing a composite electrode including a composite, wherein the composite comprises a carbon support and an inorganic material immobilized on the carbon support; subjecting a liquid containing the ions through an apparatus including the composite electrode; and applying a voltage to the composite electrodes to selectively remove the ions.

DETAILED DESCRIPTION OF THE INVENTION

The following specific examples are used for illustrating the present disclosure. A person skilled in the art can easily conceive the other advantages and effects of the present disclosure.

The present disclosure provides a method for selective electrochemical removal of ions. First, a composite electrode including a composite is provided, wherein the composite comprises a carbon support and an inorganic material immobilized on the carbon support. Subsequently, a liquid containing the ions is subjected through an apparatus including the composite electrode. Finally, a voltage to the composite electrode is applied to selectively remove the ions.

The present disclosure provides a composite for selective electrochemical removal of ions, comprising a carbon support and an inorganic material immobilized on the carbon support. The carbon support is used for distributing the inorganic material.

In some embodiments, the inorganic material such as zeolite and $TiO_2$ are used for illustrating the present disclosure. In addition, the inorganic material comprises at least one selected from the group consisting of $Al_2O_3$, $Al(OH)_3$, $Fe(OH)_3$, and $Fe_2O_3$.

In one embodiment, the carbon support comprises at least one selected from the group consisting of activated carbon, carbon nanotube, graphene, acetylene black, graphite and carbon black.

In one embodiment, the inorganic material according to the present disclosure is zeolite, and an amount of the zeolite is from 40 wt % to 70 wt %, based on the total weight of the composite.

In one embodiment, the zeolite is clinoptilolite ($Na_6$ ($Al_6Si_{30}O_{72}$).$24H_2O$, Si/Al=5) or mordenite ($Na_8$ ($Al_8Si_{40}O_{96}$).$24H_2O$, Si/Al=5).

In one embodiment, the zeolite is Na-zeolite.

In one embodiment, the Si/Al atomic ratio of Na-zeolite is 5 to 6, preferably is 5. When the Si/Al atomic ratio of zeolite is higher, the zeolite is more hydrophobic and the ion exchange sites become less. When the Si/Al atomic ratio of zeolite is lower, the zeolite is more hydrophilic and the ion exchange sites become more. Therefore, the lower Si/Al atomic ratio of zeolite is in favor of adsorption of ammonium ion.

In one embodiment, the inorganic material according to the present disclosure is $TiO_2$, and an amount of $TiO_2$ is from 10 wt % to 20 wt %, based on the total weight of the composite.

In one embodiment, the $TiO_2$ is anatase-crystal structure.

The composite electrode for selective electrochemical removal of ions provided by the present disclosure comprises a current collector and a composite mounted on the current collector. The current collector is used as a base material for coating the composite. The current collector's shape is not particularly limited. Generally, the current collector has conductivity and its shape is foil, platelet or sheet. In one embodiment, the current collector is made of nickel, copper, titanium, stainless steel or graphite.

In one embodiment, the selective electrochemical removal of ions comprises at least one selected from the group consisting of ammonium, indium, calcium and arsenic. The aforementioned ions independently exist with other ions in the wastewater. For example, one wastewater simultaneously comprises ammonium salts and potassium salts, such as $NH_4Cl$ and KCl. Another wastewater simultaneously comprises indium salts and zinc salts, such as $In(NO_3)_3$ and $Zn(NO_3)_2$. Another wastewater simultaneously comprises calcium salts and magnesium salts such as $CaSO_4$, $CaCl_2$, $MgSO_4$ and $MgCl_2$. Another wastewater simultaneously comprises arsenate salts and calcium salts, such as $Ca_3(AsO_4)_2$, $CaSO_4$ and $CaCl_2$.

In one embodiment, the composite is fixed on the current collector by a binder. The binder is mixed with the composite and adhered on the current collector. The binder can be a polymeric binder, and the polymer having great heat resistance, stability and corrosion resistance can be selected for use. In one embodiment, the binder is a fluorine-containing polymer such as polyvinylidene fluoride or polytetrafluoroethylene.

In one embodiment, the carbon support comprises at least one selected from the group consisting of activated carbon, carbon nanotube, graphene, acetylene black, graphite and carbon black. The composite electrode can further comprise a conducting component comprising at least one selected from the group consisting of graphite, carbon black, carbon nanotube, graphene and acetylene black. For example, when the carbon support is activated carbon, in addition to the binder, carbon support and the inorganic material, the composite electrode further comprises at least one conducting component selected from the group consisting of graphite, carbon black, carbon nanotube, graphene and acetylene black.

In one embodiment, when the ion species is ammonium, the inorganic material according to the present disclosure is zeolite, and an amount of the zeolite is from 40 wt % to 70 wt %, based on the total weight of the composite.

In one embodiment, when the ion species is indium, the inorganic material according to the present disclosure is $TiO_2$, and an amount of $TiO_2$ is from 10 wt % to 20 wt %, based on the total weight of the composite.

The present disclosure further provides an apparatus for selective electrochemical removal of ions, wherein the apparatus comprises at least one electrochemical cell comprising a pair of distal electrodes, and a plurality of median electrodes disposed between the pair of distal electrodes, and wherein the distal electrodes and the plurality of median electrodes are the composite electrodes.

In one embodiment, each of the median electrodes has at least one perforation.

Figure 1:
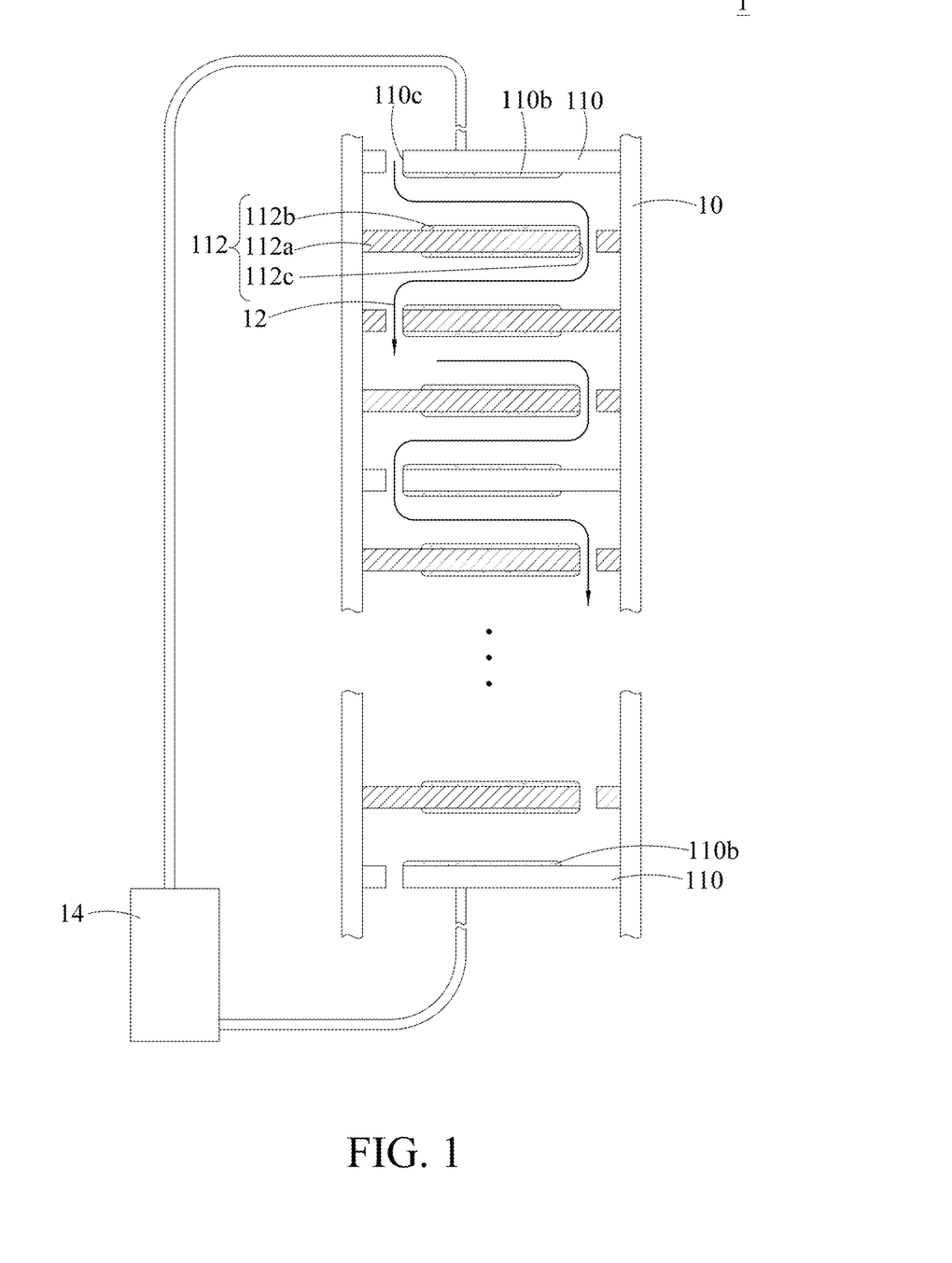
FIG. 1 is a cross-sectional view of the apparatus for selective electrochemical removal of ions according to the present disclosure.

As shown in FIG. 1, the apparatus for selective electrochemical removal of ions comprises at least one electrochemical cell 10; a pair of distal electrodes 110 disposed in the electrochemical cell 10; and a plurality of median electrodes 112 disposed in the electrochemical cell 10 and placed between the pair of distal electrodes 110. In addition, there are at least one liquid passage 12 between the pair of distal electrodes 110 and the plurality of median electrodes 112 for the liquid containing ions. Further, the plurality of median electrodes 112 are the composite electrodes for selective electrochemical removal of ions according to the present disclosure, that is, they comprise a current collector 112a and a composite 112b mounted on the current collector 112a. The composite 112b can be coated on the two sides of the current collector 112a and partly coated on the area of each side of the current collector 112a as shown in FIG. 1.

However, the composite 112b also can be coated on the whole side of the current collector 112a. In addition, the median electrodes 112 and the distal electrodes 110 may comprise same or different composites, and thus the apparatus for selective electrochemical removal of ions 1 may individually remove one or more species of ions.

In one embodiment, the pair of distal electrodes 110 is the composite electrode for selective electrochemical removal of ions according to the present disclosure. Taking FIG. 1 for example, the composite 110b is mounted on the surface of the current collector of the distal electrode 110.

As shown in the embodiment of FIG. 1, the liquid passage 12 is consisting of at least one perforation 112c of each of the median electrodes 112.

In addition, the distal electrodes 110 also can have perforations 110c to form the liquid passage 12. Moreover, the apparatus for selective electrochemical removal of ions can have a plurality of electrochemical cells to form a module for carrying a liquid by the liquid passage 12.

In the embodiment of FIG. 1, the apparatus for selective electrochemical removal of ions 1 according to the present disclosure further comprises a power source 14 electrically connected to the pair of distal electrodes 110 and the median electrodes 112.

In the method of the present disclosure, the ionic concentration of the liquid carried through the electrochemical cell is from 1 mg/L to 1000 mg/L. By applying a voltage of −1 V to −0.1 V to the plurality of median electrodes and the pair of distal electrodes, a redox reaction of the ions can be avoided and the ions in the liquid are rapidly adsorbed by the composite electrode of the present disclosure during electrically driven process.

In one embodiment, when the ions are $NH_4^+$, the voltage applied to the composite electrodes is −1 V to −0.1 V. In one embodiment, when the ions are $NH_4^+$, the voltage applied to the composite electrodes is −1 V to −0.5 V. In another embodiment, when the ions are $In^{3+}$, the voltage applied to the composite electrodes is −0.7 V to −0.1 V. In another embodiment, when the ions are $In^{3+}$, the voltage applied to the composite electrodes is −0.7 V to −0.5V.

EXAMPLE

Preparation Example 1: Preparation of Zeolite

Figure 2:
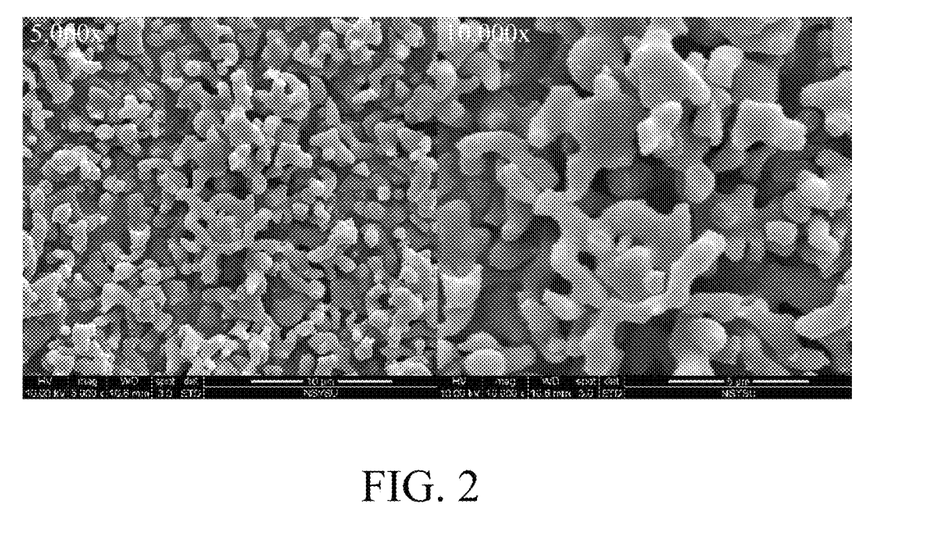
FIG. 2 is a scanning electron microscope (SEM) picture of the zeolite in Preparation Example 1.

A zeolite was synthesized with mole ratio of 20 $Na_2O$: $Al_2O_3$:10 $SiO_2$:300 $H_2O$ by hydrothermal method (180° C. for 72 hours). The synthesized product was washed and centrifugalized with the deionized water several times until the pH of cleaning fluid maintained neutral. After that, the synthesized product was dried at 100° C. for 48 hours. The end product zeolite power was obtained. The scanning electron microscope (SEM) pattern of the end product zeolite is shown in FIG. 2. As shown in FIG. 2, the microstructure of zeolites comprises a plurality of rods which connect with each other, with a length between 2 μm and 5 μm and a width of about 500 nm.

Preparation Example 2: Preparation of C/Zeolite Composite Electrode

First, a composite was prepared by immobilizing the zeolite on graphite. The composite and polyvinylidene fluoride (PVDF, Molecular weight: 534,000) were mixed in N-methyl pyrrolidone (NMP) solvent and stirred evenly as an electrode slurry. C/Zeolite 70 composite electrode, C/Zeolite 40 composite electrode and C/Zeolite 20 composite electrode individually includes zeolite of 70 wt %, 40 wt % and 20 wt %; graphite of 10 wt %, 50 wt % and 70 wt %; and PVDF of 10 wt %. The electrode slurry was coated on titanium foil evenly by a doctor blade technique (wet thickness 300 μm) and then oven-dried at 100° C. for 6 hours.

Test Example 1: Adsorption Test of Ammonium Ion with Zeolite Powder

Raw water was a mixed solution of 10 mg/L of $NH_4^+$ and 10 mg/L of $K^+$ prepared by $NH_4Cl$ and KCl. The pH value of raw water was adjusted to 5.0 with 1 N of HCl. After that, 0.01 g of zeolite powder of Preparation Example 1 was added to 40 mL of raw water with stirring for 5 minutes. Then, the concentration of $NH_4^+$ and $K^+$ in the treated water was measured by ion chromatography (IC).

Figure 3:
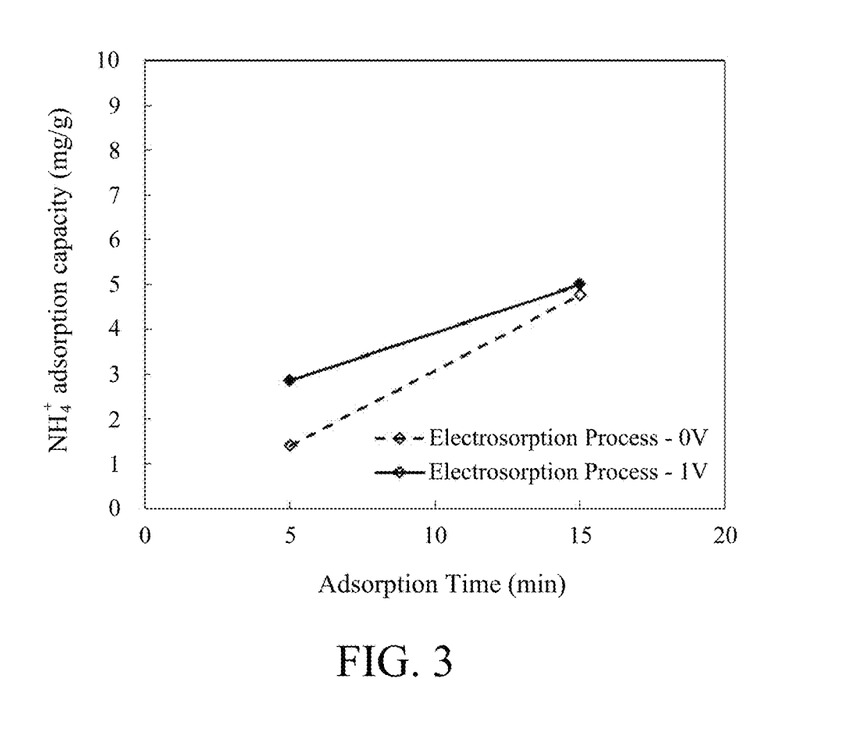
FIG. 3 shows the relationship between $NH_4^+$ adsorption capacity and adsorption time of the graphite/zeolite composite electrode according to Preparation Example 2.

Test Example 2: Adsorption Test of Ammonium Ion with C/Zeolite Composite Electrode Raw water was a mixed solution of 10 mg/L of $NH_4^+$ and 10 mg/L of $K^+$ prepared by $NH_4Cl$ and KCl. The C/Zeolite 70 composite electrode of Preparation Example 2 was used in the adsorption test for examining the adsorption capacity and selectivity to ammonium ion. For comparing the $NH_4^+$ adsorption capacity of the composite electrode under different applied voltage and time, the electro-adsorption tests were conducted in the condition of −1 V and 0 V for 5 and 15 minutes. As shown in FIG. 3, when the adsorption test was conducted at −1 V for 5 minutes, it appears higher $NH_4^+$ adsorption capacity than that of the test at 0 V; when the test time extended to 15 minutes, similar $NH_4^+$ adsorption capacity appears at both applied voltage. Therefore, in one embodiment, the applied time to the composite electrodes is 5 minutes.

Further, according to the results of $NH_4^+$ adsorption rate as shown in Table 1, the $NH_4^+$ adsorption rate of C/Zeolite composite electrode by the selective electrochemical removal method is higher than the adsorption rate of the zeolite powder. To compared 0 V (no voltage is applied) with −1 V case, the $NH_4^+$ adsorption capacity of C/Zeolite 70 composite electrode could be increased from 0.28 mg/g-min to 0.57 mg/g-min. Accordingly, the $NH_4^+$ adsorption ability of the electrode is affected by the electrical driving force. In addition, the $NH_4^+$ adsorption rate of C/Zeolite 70 composite electrode is higher 6.3 times than that of C electrode. That is to say, the ability of $NH_4^+$ adsorption of C electrode is extraordinarily enhanced by zeolite modification.

Figure 4:
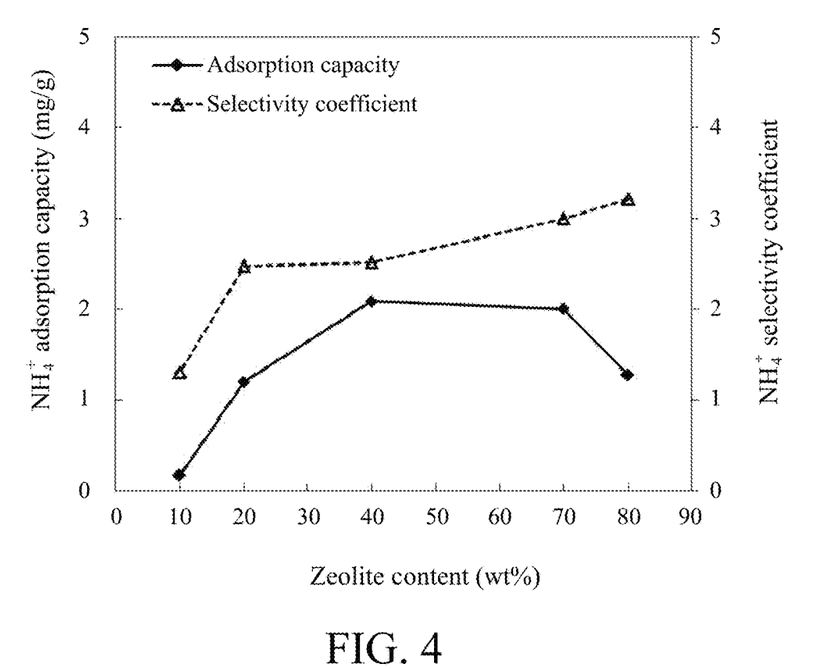
FIG. 4 shows the relationship between $NH_4^+$ adsorption capacity/$NH_4^+$ selectivity coefficient and zeolite content of the graphite/zeolite composite electrode.

As shown in FIG. 4, under the same applied time (5 mins), the $NH_4^+$ adsorption capacity and $NH_4^+$ selectivity coefficient of C/Zeolite composite electrode are affected by different content of zeolite. When the amount of zeolite varies from 10 wt % to 70 wt %, the $NH_4^+$ adsorption capacity and $NH_4^+$ selectivity coefficient are both increased. However, when increasing the amount of zeolite to 80 wt %, the $NH_4^+$ adsorption capacity decreases. An excessive of zeolite may decrease the conductivity of the composite electrode and result in decreased $NH_4^+$ adsorption capacity. Therefore, in one embodiment, the amount of zeolite of C/Zeolite composite electrode is 70 wt %.

Based on the above results, the C/Zeolite composite electrode of the present disclosure has effect of selective adsorption of ammonium ions and higher adsorption rate.

TABLE 1

| Adsorption material | Adsorption time (min) | Voltage (V) | Adsorption capacity (mg/g) | | $NH_4^+$ adsorption rate (mg/g-min) |
|---|---|---|---|---|---|
| | | | $NH_4^+$ | $K^+$ | |
| Zeolite powder | 5 | — | 2.45 | 1.28 | 0.50 |
| C electrode | 5 | −1 | 0.44 | 0.14 | 0.09 |
| C/Zeolite 70 composite electrode | 5 | 0 | 1.40 | 0.70 | 0.28 |
| C/Zeolite 70 composite electrode | 5 | −1 | 2.86 | 0.67 | 0.57 |
| C/Zeolite 70 composite electrode | 15 | −1 | 5.00 | 2.50 | 0.33 |

Figure 5:
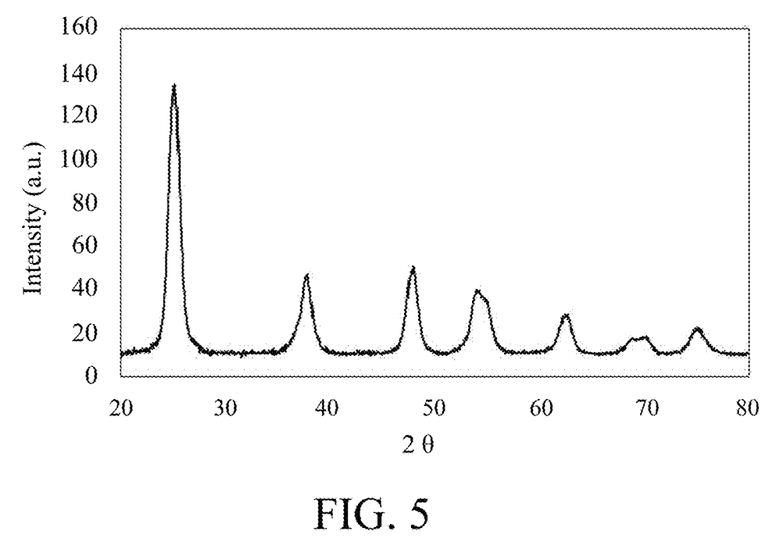
FIG. 5 is an XRD pattern of the $TiO_2$ according to Preparation Example 3.

Preparation Example 3: Preparation of $TiO_2$ $TiO_2$ was prepared with 114 ml of deionized water, 90 g of titanium tetraisopropoxide (TTIP, $TiO_2$ precursor, available from Merck) and 286 g of 1-butyl-3-Methylimidazolium tetrafluoroborate ($[Bmim]^+[BF_4]^-$, ionic liquid (IL), available from Merck). The preparation procedure was as follows. The ionic liquid and deionized water were mixed and stirred as premixed solution. Titanium tetraisopropoxide (mole ratio of TTIP:IL:$H_2O$ is 1:4:20) was added into the premixed solution, and then proceeded to the heating process (reaction temperature: 150° C.). The synthesized product was washed and centrifugalized with the deionized water several times. After that, the synthesized product was dried at 100° C. for 24 hours. The end product $TiO_2$ power was obtained. The X-ray diffraction (XRD) pattern of the end product $TiO_2$ is shown in FIG. 5. As shown in FIG. 5, the crystalline phase of $TiO_2$ is anatase, and the crystal grain size of $TiO_2$ is from 5 nm to 30 nm.

Preparation Example 4: Preparation of $C/TiO_2$ Composite Electrode

First, a composite was prepared by immobilizing the $TiO_2$ on carbon black. The composite and polyvinylidene fluoride (PVDF, Molecular weight: 534,000) were mixed in N-methyl pyrrolidone (NMP) solvent and stirred evenly as an electrode slurry. $C/TiO_2$ 70 composite electrode, $C/TiO_2$ composite 40 electrode and $C/TiO_2$ 20 composite electrode individually includes $TiO_2$ of 70 wt %, 40 wt % and 20 wt %; carbon black of 10 wt %, 50 wt % and 70 wt %; and PVDF of 10 wt %. The electrode slurry was coated by blade (300 μm) on titanium foil evenly, and oven-dried at 100° C. for 24 hours.

Test Example 3: Adsorption Test of Indium Ion with $TiO_2$ Powder

Raw water was a mixed solution of 200 mg/L of $In^{3+}$ and 200 mg/L of $Zn^{2+}$ prepared by $In(NO_3)_3$ and $Zn(NO_3)_2$. The pH value of raw water was adjusted to 3.5 with 2 N of NaOH. After that, adding 0.25 g of $TiO_2$ powder of Preparation Example 3 to 25 mL of raw water with stirring for 5 minutes. Then, the concentration of $In^{3+}$ and $Zn^{2+}$ in the raw water was measured by inductively coupled plasma optical emission spectrometry (ICP-OES).

Figure 6:
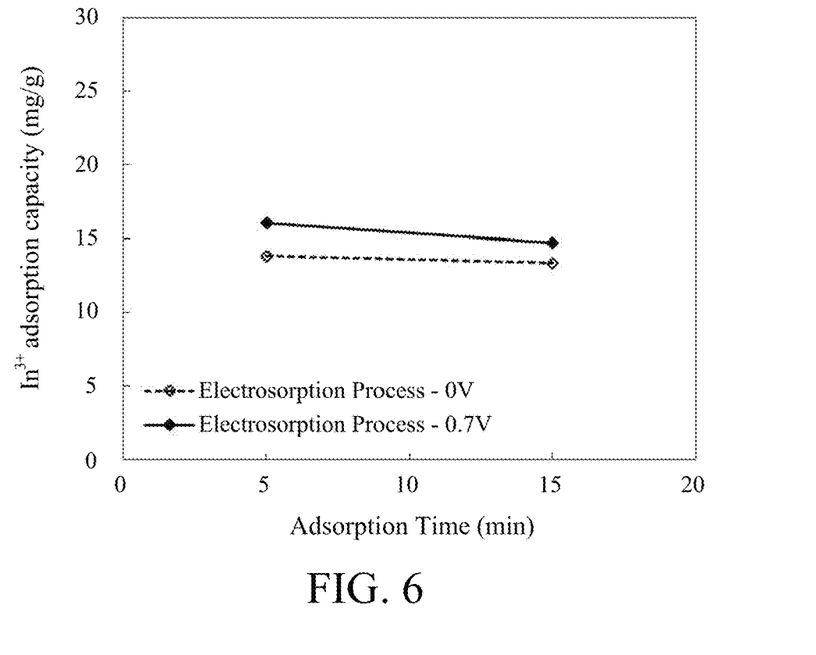
FIG. 6 shows the relationship between $In^{3+}$ adsorption capacity and adsorption time of the carbon black/$TiO_2$ composite electrode according to Preparation Example 4.

Test Example 4: Adsorption Test of Indium Ion with $C/TiO_2$ Composite Electrode Raw water was a mixed solution of 200 mg/L of $In^{3+}$ and 200 mg/L of $Zn^{2+}$ prepared by $In(NO_3)_3$ and $Zn(NO_3)_2$. The $C/TiO_2$ 70 composite electrode of Preparation Example 4 was used in the adsorption test for examining the adsorption capacity and selectivity to indium ion. For comparing the $In^{3+}$ adsorption capacity of the composite electrode under different applied voltage and time, the electro-adsorption tests were conducted in the condition of −0.7 V and 0 V for 5 and 15 minutes. As shown in FIG. 6, when the adsorption test was conducted at −0.7 V for 5 minutes, it appears higher $In^{3+}$ adsorption capacity than that of the test at 0 V; when the test time extended to 15 minutes, the $In^{3+}$ adsorption capacity at both applied voltage appears closer. Therefore, in one embodiment, the applied time to the pair of distal electrodes is 5 minutes.

Further, according to the results of $In^{3+}$ adsorption rate as shown in Table 2, the $In^{3+}$ adsorption rate of $C/TiO_2$ composite electrode by the selective electrochemical removal method is higher than the adsorption rate of the $TiO_2$ powder. Compared to 0 V (no voltage is applied) and −0.7 V, the $In^{3+}$ adsorption capacity of $C/TiO_2$ 70 composite electrode could be increased from 2.76 mg/g-min to 3.21 mg/g-min. Accordingly, the ability of $In^{3+}$ adsorption is affected by the electrical driving force. In addition, the $In^{3+}$ adsorption rate of $C/TiO_2$ 70 composite electrode is 1.7 times higher than that of C electrode. That is to say, the ability of $In^{3+}$ adsorption of C electrode is extraordinarily enhanced by $TiO_2$ modification.

Figure 7:
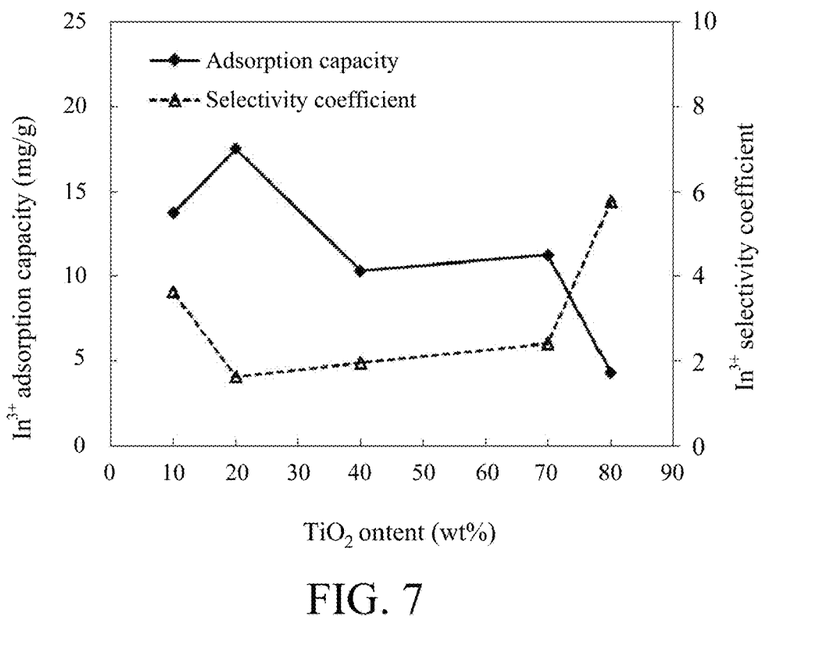
FIG. 7 shows the relationship between $In^{3+}$ adsorption capacity/$In^{3+}$ selectivity coefficient and $TiO_2$ content of the carbon black/$TiO_2$ composite electrode.

As shown in FIG. 7, under the same applied time (5 mins), the $In^{3+}$ adsorption capacity and $In^{3+}$ selectivity coefficient of $C/TiO_2$ composite electrode are affected by different amounts of $TiO_2$. When the amount of $TiO_2$ varies from 10 wt % to 20 wt %, the $In^{3+}$ adsorption capacity is increased. When the amount of $TiO_2$ varies from 20 wt % to 80 wt %, the $In^{3+}$ adsorption capacity decreases, but the $In^{3+}$ selectivity coefficient is increased. An excessive of $TiO_2$ may decrease the conductivity of the composite electrode and result in decreased $In^{3+}$ adsorption capacity. Therefore, in one embodiment, the amount of $TiO_2$ of $C/TiO_2$ composite electrode is 10 to 20 wt %.

Based on the above results, the $C/TiO_2$ composite electrode of the present disclosure has effect of fast-selective adsorption of indium ions.

TABLE 2

| Adsorption material | Adsorption time (min) | Voltage (V) | Adsorption capacity (mg/g) | | $In^{3+}$ adsorption rate (mg/g-min) |
|---|---|---|---|---|---|
| | | | $In^{3+}$ | $Zn^{2+}$ | |
| $TiO_2$ powder | 5 | — | 13.90 | 0.10 | 2.78 |
| C electrode | 5 | −0.7 | 9.24 | 0.84 | 1.85 |
| $C/TiO_2$ 70 composite electrode | 5 | 0 | 13.81 | 3.81 | 2.76 |
| $C/TiO_2$ 70 composite electrode | 5 | −0.7 | 16.07 | 6.70 | 3.21 |
| $C/TiO_2$ 70 composite electrode | 15 | −0.7 | 14.73 | 2.23 | 0.98 |

The above-described descriptions of the detailed embodiments are only to illustrate the principle and efficacy of the present disclosure, and it is not to limit the present disclosure. It is possible for one person skilled in the art to modify the above embodiments without departing from the spirit and scope of the present disclosure. The scope of present disclosure, therefore, should be defined by the appended claims.

The invention claimed is:

1. A method for selective electrochemical removal of ions, comprising:
   providing a composite electrode including a composite, wherein the composite comprises a carbon support and an inorganic material immobilized on the carbon support;
   subjecting a liquid containing the ions through an apparatus including the composite electrode; and
   applying a voltage to the composite electrode to selectively remove the ions wherein the inorganic material comprises at least one selected from the group consisting of zeolite, $TiO_2$, $Al(OH)_3$, $Fe(OH)_3$ and $Fe_2O_3$ and wherein the zeolite has a Si/Al atomic ratio of from 5 to 6, and when the inorganic material is $TiO_2$, an amount of the $TiO_2$ is in a range of from 10 wt % to 20 wt %, based on a total weight of the composite.

2. The method according to claim 1, wherein the carbon support comprises at least one selected from the group consisting of activated carbon, carbon nanotube, graphene, acetylene black, graphite and carbon black.

3. The method according to claim 1, wherein zeolite is Na-zeolite.

4. The method according to claim 3, wherein the Na-zeolite is clinoptilolite or mordenite.

5. The method according to claim 1, wherein the inorganic material is zeolite, and an amount of the zeolite is in a range of from 40 wt % to 70 wt %, based on a total weight of the composite.

6. The method according to claim 1, wherein the $TiO_2$ is in an anatase crystal structure.

7. The method according to claim 1, wherein the composite electrode further comprises a current collector, and the composite is mounted on the current collector.

8. The method according to claim 7, wherein the composite electrode further comprises a binder, and the composite is fixed on the current collector through the binder.

9. The method according to claim 8, wherein the binder is polyvinylidene fluoride or polytetrafluoroethylene.

10. The method according to claim 7, wherein the current collector is nickel, copper, titanium, stainless steel or graphite.

11. The method according to claim 1, wherein the apparatus comprises at least one electrochemical cell comprising:
    a pair of distal electrodes; and
    a plurality of median electrodes disposed between the pair of distal electrodes,
    wherein the distal electrodes and the plurality of median electrodes are the composite electrodes.

12. The method according to claim 11, wherein each of the median electrodes has at least one perforation.

13. The method according to claim 11, wherein each of the median electrodes and the distal electrodes is same.

14. The method according to claim 11, wherein each of the median electrodes and the distal electrodes is different.

15. The method according to claim 1, wherein the ions comprise at least one selected from the group consisting of ammonium, indium, calcium and arsenic.

16. The method according to claim 15, wherein the ions are $NH_4^+$, and the voltage applied to the composite electrodes is −1 V to −0.5 V.

17. The method according to claim 15, wherein the ions are $In^{3+}$, and the voltage applied to the composite electrodes is −0.7 V to −0.5 V.

\* \* \* \* \*